United States Patent
Love et al.

(10) Patent No.: US 8,478,328 B2
(45) Date of Patent: *Jul. 2, 2013

(54) POWER CONTROL IN SCHEDULABLE WIRELESS COMMUNICATION TERMINAL

(75) Inventors: Robert T. Love, Barrington, IL (US); Brian K. Classon, Palatine, IL (US); Edgar P. Fernandes, Winchester (GB); Armin W. Klomsdorf, Libertyville, IL (US); Vijay Nangia, Algonquin (IL); Ravikiran Nory, Grayslake, IL (US); Dale G. Schwent, Schaumburg, IL (US); Kenneth A. Stewart, Grayslake, IL (US); David R. Wilson, Hainsville, IL (US)

(73) Assignee: Motorola Mobility LLC, Libertyville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/418,375

(22) Filed: Mar. 13, 2012

(65) Prior Publication Data

US 2012/0172080 A1 Jul. 5, 2012

Related U.S. Application Data

(63) Continuation of application No. 11/337,753, filed on Jan. 23, 2006, now Pat. No. 8,145,251.

(51) Int. Cl.
*H04B 7/00* (2006.01)
(52) U.S. Cl.
USPC ........ 455/522; 455/572; 455/574; 455/127.5; 455/127.1; 455/343.1; 455/343.5

(58) Field of Classification Search
USPC ................... 455/522, 572, 574, 127.5, 127.1, 455/343.1, 343.5
See application file for complete search history.

(56) References Cited

U.S. PATENT DOCUMENTS 4,939,786 A * 7/1990 McCallum et al. ........ 455/67.11
5,155,448 A 10/1992 Powell
(Continued)

FOREIGN PATENT DOCUMENTS

WO 0118987 A1 3/2001
WO 02100025 A1 12/2002
(Continued)

OTHER PUBLICATIONS

3GPP TS 36.101 v8.1.0 (Mar. 2008) 3rd Generation Partnership Project; Technical Specification Group Radio Access Network; Evolved Universal Terrestrial Radio Access (E-UTRA); User Equipment (UE radio transmission and reception (Release 9), 43 pages.

(Continued)

*Primary Examiner* — Wayne Cai
*Assistant Examiner* — Shantell L Heiber

(57) ABSTRACT

A wireless communication entity schedulable in a wireless communication network include a radio receiver that receives radio resource assignment information including a bandwidth allocation, a controller communicably coupled to the power amplifier, wherein the controller varies an operational maximum power level of the schedulable wireless communication entity based on whether the schedulable wireless communication entity is communicating time-critical traffic or non-time-critical traffic, and wherein the operational maximum power level limits an instantaneous power at which the schedulable wireless communication entity may transmit on the radio resource assigned.

16 Claims, 6 Drawing Sheets

U.S. PATENT DOCUMENTS

| | | | |
|---|---|---|---|
| 6,160,449 | A | 12/2000 | Klomsdorf et al. |
| 6,166,598 | A | 12/2000 | Schluefer |
| 6,175,550 | B1 | 1/2001 | van Nee |
| 6,281,748 | B1 | 8/2001 | Klomsdorf et al. |
| 6,421,541 | B1 | 7/2002 | Karlsson et al. |
| 6,611,676 | B2 | 8/2003 | Ue et al. |
| 6,836,666 | B2 | 12/2004 | Gopalakrishnan et al. |
| 6,934,268 | B1 | 8/2005 | Hedlund et al. |
| 6,944,460 | B2 | 9/2005 | Haartsen |
| 6,983,026 | B2 | 1/2006 | Pinckley et al. |
| 6,985,704 | B2 | 1/2006 | Yang et al. |
| 7,151,795 | B1 * | 12/2006 | Goldburg ............... 375/227 |
| 7,519,013 | B2 | 4/2009 | Destino et al. |
| 7,664,465 | B2 | 2/2010 | Shen et al. |
| 7,877,108 | B2 | 1/2011 | Wengerter et al. |
| 2001/0027113 | A1 | 10/2001 | Hayashihara |
| 2003/0100328 | A1 | 5/2003 | Klein et al. |
| 2004/0147276 | A1 | 7/2004 | Gholmieh |
| 2004/0162097 | A1 | 8/2004 | Vijayan et al. |
| 2004/0192323 | A1 | 9/2004 | Valenzuela |
| 2005/0111391 | A1 | 5/2005 | Oki et al. |
| 2005/0201180 | A1 | 9/2005 | Naguib et al. |
| 2006/0135075 | A1 | 6/2006 | Tee et al. |
| 2007/0097853 | A1 * | 5/2007 | Khandekar et al. ............ 370/208 |
| 2007/0173260 | A1 | 7/2007 | Love et al. |
| 2009/0143070 | A1 | 6/2009 | Shu et al. |

FOREIGN PATENT DOCUMENTS

| | | |
|---|---|---|
| WO | 2004045228 A1 | 5/2004 |
| WO | 2004077664 A1 | 9/2004 |
| WO | 2006007318 A1 | 1/2006 |

OTHER PUBLICATIONS

European Patent Office, "Supplementary European Search Report" for European Patent Application No. 07701239.1 dated Sep. 6, 2012, 7 pages.

3GPP TSG RAN WG1 LTE Adhoc; Tdoc# R1-060144, UE Power Management for EUTRA Motorola; Helsinki, Finland; Jan. 23-25, 2005, 5 pages.

3GPP TSG RAN WG1 LTE Adhoc; Tdoc# R1-060023, "Cubic Metric in 3GPP-LTE" Motorola; Helsinki, Finland; Jan. 23-26, 2006, 7 pages.

United States Patent and Trademark Office, "Non-Final Rejection" for U.S. Appl. No. 11/337,856 Aug. 20, 2013, 13 pages.

* cited by examiner

| | FRACTIONAL BWO RELATIVE TO 4.5 MHz | | | | | | | | | | | COMMENT |
|---|---|---|---|---|---|---|---|---|---|---|---|---|
| 1/12 | 2/12 | 3/12 | 4/12 | 5/12 | 6/12 | 7/12 | 8/12 | 9/12 | 10/12 | 11/12 | 1 | |
| - | NA | - | NA | - | -2.24 | - | -0.55 | - | 0.39 | - | 0.77 | DC CENTERED |
| -0.71 | -0.32 | -0.09 | 0.07 | 0.19 | 0.30 | 0.38 | 0.50 | 0.57 | 0.61 | 0.66 | 0.77 | BAND EDGE |

POWER CONTROL IN SCHEDULABLE WIRELESS COMMUNICATION TERMINAL

The present application is a continuation of commonly assigned and co-pending U.S. application Ser. No. 11/337,753 filed on 23 Jan. 2006, the contents of which are incorporated herein by reference and from which benefits are claimed under 35 U.S.C. 120.

FIELD OF THE DISCLOSURE

The present disclosure relates generally to wireless communications, and more particularly to radio resource scheduling in wireless communication networks, corresponding devices and methods.

BACKGROUND

Some effort is being expended during the specification phase of contemporary broadband wireless communication standards such as the Third Generation Partnership Project (3GPP) Long Term Evolution (LTE) protocol, also referred to as Evolved Universal Mobile Telecommunications System (UMTS) Terrestrial Radio Access or E-UTRA, to improve the performance and efficiency of the power amplifier (PA) in mobile terminals or user equipment (UE). Toward this objective, there are a number of key performance metrics, but the over-riding goal is to minimize the PA power consumption (or peak and/or mean current drain), cost and the complexity required to deliver a given specified conducted power level, for example, +21 dBm or +24 dBm, to the UE antenna.

Generally, the required conducted power level must be achieved within a specified lower bound on in-band signal quality, or error vector magnitude (EVM) of the desired waveform, and an upper bound of signal power leakage out of the desired signal bandwidth and into the receive signal band of adjacent or alternate carrier receivers. These effects may be subsumed into the broader term "waveform quality".

These problems represent classical PA design challenges, but emerging broadband wireless networks such as 3GPP LTE must solve these problems in the context of new modes of system operation. For example, PA operation must be optimized while transmitting new waveform types, including multi-tone waveforms and frequency-agile waveforms occupying variable signal bandwidths (within a nominal bandwidth, sometimes referred to as a channel or carrier bandwidth). Further, PA performance must now be optimized in a predominantly packet switched (PS) network where a network entity, such as a base station, schedules multiple wireless communication entities or terminals to transmit simultaneously. PA performance also must be optimized in the presence of numerous different frequency or spatially adjacent radio technologies, including GSM, UMTS, WCDMA, and unlicensed transmitter and receivers, among other radio technologies.

The various aspects, features and advantages of the disclosure will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

Figure 1:
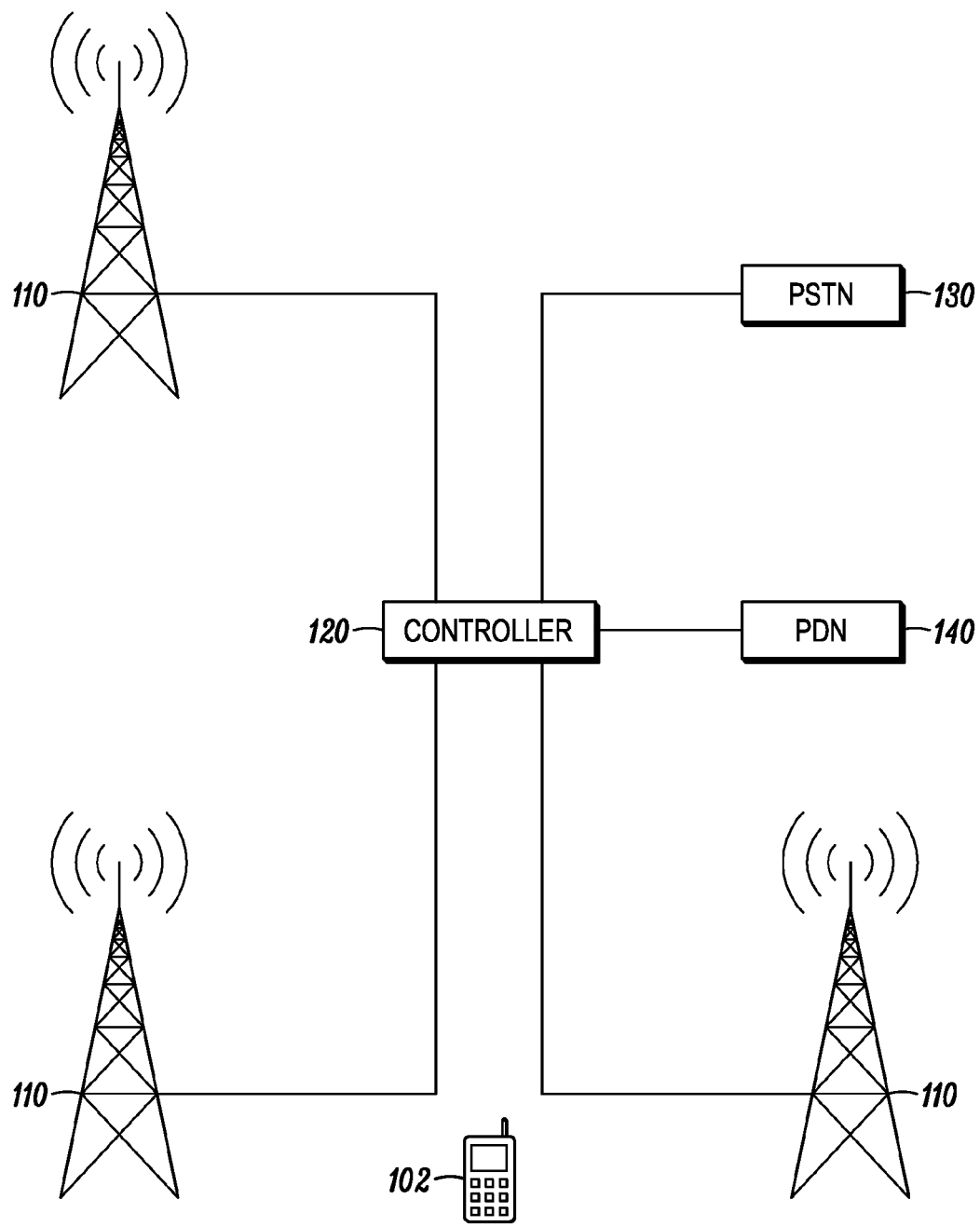
FIG. 1 illustrates an exemplary wireless communication system.

In FIG. 1, the exemplary wireless communication system comprises a cellular network including multiple cell serving base stations 110 distributed over a geographical region. The cell serving base station (BS) or base station transceiver 110 is also commonly referred to as a Node B or cell site wherein each cell site consists of one or more cells, which may also be referred to as sectors. The base stations are communicably interconnected by a controller 120 that is typically coupled via gateways to a public switched telephone network (PSTN) 130 and to a packet data network (PDN) 140. The base stations additionally communicates with mobile terminals 102 also commonly referred to as User Equipment (UE) or wireless terminals to perform functions such as scheduling the mobile terminals to receive or transmit data using available radio resources. The network also comprises management functionality including data routing, admission control, subscriber billing, terminal authentication, etc., which may be controlled by other network entities, as is known generally by those having ordinary skill in the art.

Exemplary cellular communication networks include 2.5 Generation 3GPP GSM networks, 3rd Generation 3GPP WCDMA networks, and 3GPP2 CDMA communication networks, among other existing and future generation cellular communication networks. Future generation networks include the developing Universal Mobile Telecommunications System (UMTS) networks, Evolved Universal Terrestrial Radio Access (E-UTRA) networks. The network may also be of a type that implements frequency-domain oriented multi-carrier transmission techniques, such as Frequency Division Multiple Access (OFDM), DFT-Spread-OFDM, IFDMA, etc., which are of interest for future systems. Single-carrier based approaches with orthogonal frequency division (SC-FDMA), particularly Interleaved Frequency Division Multiple Access (IFDMA) and its frequency-domain related variant known as DFT-Spread-OFDM (DFT-SOFDM), are attractive in that they optimise performance when assessed using contemporary waveform quality metrics, which may include peak-to-average power ratio (PAPR) or the so-called cubic metric (CM). These metrics are good indicators of power backoff or power de-rating necessary to maintain linear power amplifier operation, where 'linear' generally means a specified and controllable level of distortion both within the signal bandwidth generally occupied by the desired waveform and in neighboring frequencies.

In OFDM networks, both Time Division Multiplexing (TDM) and Frequency Division Multiplexing (FDM) are employed to map channel-coded, interleaved and data-modulated information onto OFDM time/frequency symbols. The OFDM symbols can be organized into a number of resource blocks consisting of M consecutive sub-carriers for a number N consecutive OFDM symbols where each symbol may also include a guard interval or cyclic prefix. An OFDM air interface is typically designed to support carriers of different bandwidths, e.g., 5 MHz, 10 MHz, etc. The resource block size in the frequency dimension and the number of available resource blocks are generally dependent on the bandwidth of the system.

Figure 2:
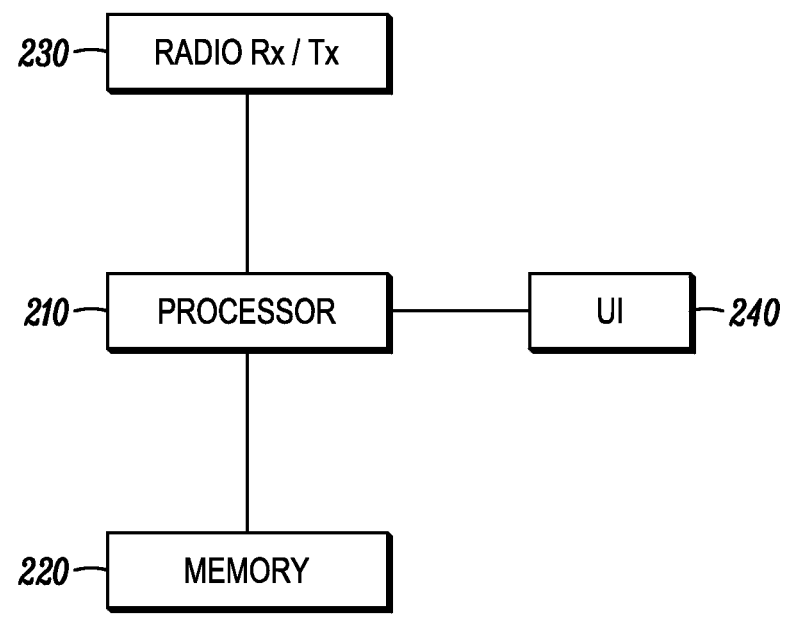
FIG. 2 illustrates a wireless communication entity.

In FIG. 2, the exemplary wireless terminal 200 comprises a processor 210 communicably coupled to memory 220, for example, RAM, ROM, etc. A wireless radio transceiver 230 communicates over a wireless interface with the base stations of the network discussed above. The terminal also includes a user interface (UI) 240 including a display, microphone and audio output among other inputs and outputs. The processor may be implemented as a digital controller and/or a digital signal processor under control of executable programs stored in memory as is known generally by those having ordinary skill in the art. Wireless terminals, which are referred to as User Equipment (UE) in WCDMA networks, are also referred to herein as schedulable wireless communication entities, as discussed more fully below.

User equipment operating in a cellular network operate in a number of 'call states' or 'protocol states' generally conditioned on actions applicable in each state. For example, in a mode typically referred to as an 'idle' mode, UEs may roam throughout a network without necessarily initiating or soliciting uplink or downlink traffic, except, e.g., to periodically perform a location update to permit efficient network paging. In another such protocol state, the UE may be capable of initiating network access via a specified shared channel, such as a random access channel. A UE's ability or need to access physical layer resources may be conditioned on the protocol state. In some networks, for example, the UE may be permitted access to a shared control channel only under certain protocol-related conditions, e.g., during initial network entry. Alternatively, a UE may have a requirement to communicate time-critical traffic information, such as a handover request or acknowledgement message, with higher reliability. In such protocol states, the UE may be permitted, either explicitly by the network, by design, or by a controlling specification, such as a 3GPP specification, to adjust its maximum power level depending on its protocol state.

Generally, a wireless communication network infrastructure scheduling entity located, for example, in a base station 110 in FIG. 1, allocates or assigns radio resources to schedulable wireless communication entities, e.g., mobile terminals, in the wireless communication network. In FIG. 1, the base stations 110 each include a scheduler for scheduling and allocating resources to mobile terminals in corresponding cellular areas. In multiple access schemes such as those based on OFDM methods, multi-carrier access or multi-channel CDMA wireless communication protocols including, for example, IEEE-802.16e-2005, multi-carrier HRPD-A in 3GPP2, and the Long Term Evolution UTRA/UTRAN Study Item in 3GPP (also known as evolved UTRA/UTRAN (EUTRA/EUTRAN)), scheduling may be performed in the time and frequency dimensions using a Frequency Selective (FS) scheduler. To enable FS scheduling by the base station scheduler, in some embodiments, each mobile terminal provides a per frequency band channel quality indicator (CQI) to the scheduler.

In OFDM systems, a resource allocation is the frequency and time allocation that maps information for a particular UE to resource blocks as determined by the scheduler. This allocation depends, for example, on the frequency-selective channel-quality indication (CQI) reported by the UE to the scheduler. The channel-coding rate and the modulation scheme, which may be different for different resource blocks, are also determined by the scheduler and may also depend on the reported CQI. A UE may not be assigned every sub-carrier in a resource block. It could be assigned every Qth sub-carrier of a resource block, for example, to improve frequency diversity. Thus a resource assignment can be a resource block or a fraction thereof. More generally, a resource assignment is a fraction of multiple resource blocks. Multiplexing of lower-layer control signaling may be based on time, frequency and/or code multiplexing.

Figures 3, 4:
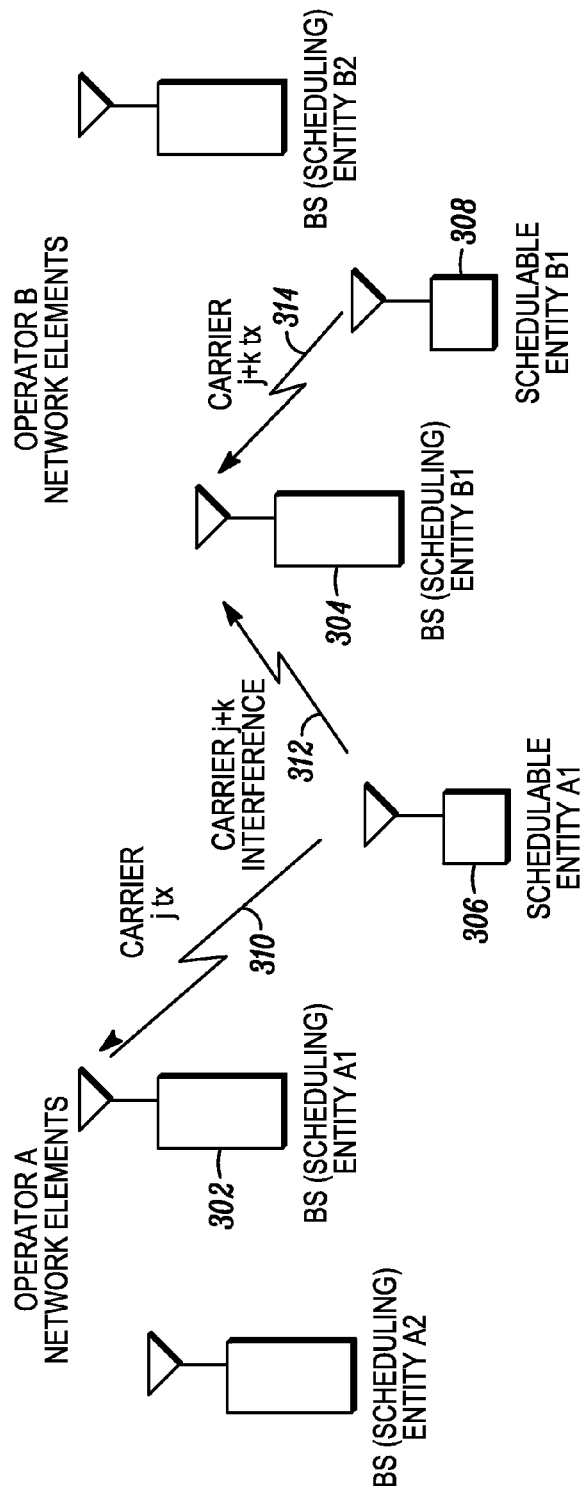
FIG. 3 illustrates neighboring communication networks.
FIG. 4 illustrates occupied bandwidth power de-rating values.

The interference impact of a network entity, for example, a schedulable wireless communication terminal, to or on an uncoordinated adjacent band entity, referred to as a victim, is shown in FIG. 3. Victim entities may be base stations or mobile terminals in immediately adjacent bands or in non-contiguous adjacent bands, all of which are generally referred to as neighboring bands. The victim receiver may operate on or belong to the same or different technology as the network entity producing the interference. The victim receiver may also operate on or belong to the same or different network types managed either by the same (coordinated) operator or by a different (uncoordinated) operator. The victim receiver may also operate on or belong to a different technology network where there is no coordination between networks to reduce interference.

Regional or international spectrum regulatory authorities frequently designate contiguous segments of radio frequency spectrum, or radio bands for use by specific duplexing modes, for example, frequency division duplexing (FDD) or time-division duplexing (TDD) or by specific wireless technologies, such as Group Special Mobile (GSM), Code Division Multiple Access (CDMA), Wideband CDMA, etc. For example, GSM networks are frequently granted access to the so-called GSM 900 MHz (or Primary GSM) band specified as the frequency-duplex pair of band between the frequencies 890-915 MHz and 935-960 MHz. This information may be stored in the UE or transmitted by the network controlling a UE in order to permit an optimum choice of PA output power back-off (also referred to as a power de-rating) or more generally to optimally adjust the maximum power level of the PA conditioned on adjacent channel interference offered to, and consistent with, the known adjacent channel technologies.

More generally, a frequency band adjacent to such a UE may be known from national or international regulations or from general deployment criteria, such as 'licensed' or 'unlicensed' designations to be subject to specific maximum levels of interference from the band in which the UE is operating. When this information is stored in the UE or made available by signaling from the network, the UE may optimize its radiated power level subject to the known adjacent band interference limits.

In FIG. 3, a schedulable entity A1 306 is scheduled aperiodically. Particularly, the entity A1 is allocated radio resources including bandwidth on carrier j 310 as well as bandwidth location in the carrier j band. The entity A1 is also allocated its transmission power assignment or power adjustment and a scheduling grant by the base station scheduling entity A1 302, which is part of network A. Schedulable entity A1 306 transmits using its assigned bandwidth on carrier j 310 when scheduled by BS scheduling entity A1 302 and creates out-of-band emissions which impinge upon other carriers including an adjacent carrier j+k and is seen as interference 312 by BS scheduling entity B1 304, which is the victim receiver or entity, resulting in reduced SNR when receiving a scheduled transmission from schedulable entity B1 308 on carrier j+k 314. Since base station entity B1 304 is part of Network B and there is no coordination, or sub-optimal coordination, between Network A and Network B then it may not be possible for scheduling entities like 306 and 308 to avoid mutual interference.

In FIG. 3, the degree to which schedulable entity A1 306 interferes with schedulable entity B1 308 on carrier j+k 314 is dependent on the radio frequency (RF) distance (also referred to as path loss) between the schedulable wireless communication entity and the other wireless communications (victim) entity. The interference is also dependent on the effective radiated power level of the transmitter, the size and amount of separation of the bandwidth allocations between entities and the amount of overlap in time. Out-of-band emissions of one transmitter will have smaller impact on another receiver if the path loss between the transmitter and victim receiver is larger, and the impact will be larger if the path loss is smaller. Adjacent channel interference is also present in TDD systems where both the BS 302 and schedulable entity 306 of Network A transmit on the same carrier 310 and both BS 304 and schedulable entity 308 of Network B transmit on the same carrier 314 and hence both BS 302 and schedulable entity 306 cause out-of-band emissions and hence interference 312 to adjacent carrier 314.

In one embodiment, the radio resource allocated to a schedulable wireless communication entity is based on an interference impact of the schedulable wireless communication entity operating on the radio resource allocated. The interference impact may be based on any one or more of the following factors: a transmission waveform type of the schedulable wireless communication entity; a maximum allowed and current power level of the schedulable wireless communication entity; bandwidth assignable to the schedulable wireless communication entity; location of the assignable bandwidth in a carrier band; radio frequency distance (path loss) relative to another wireless communications entity; variation in the maximum transmit power of the schedulable wireless communication entity for the assigned bandwidth; separation of assigned band relative to the other wireless communication entity; reception bandwidth of the victim entity, minimum SNR required for operation of the victim entity; and reception multiple access processing (e.g. CDMA, OFDM, or TDMA), among other factors. The variation in the maximum transmit power includes de-rating or re-rating the maximum transmit power of the wireless communication entity as discussed further below.

For a given carrier band and band separation, transmissions with larger occupied bandwidth (OBW) create more out-of-band emissions resulting in a larger adjacent or neighbor channel leakage ratio (ACLR) than transmissions with smaller OBW. The increase in out-of-band emissions from transmissions with larger OBW is due largely to increased adjacent channel occupancy by $3^{rd}$ and $5^{th}$ order intermodulation (IM) products. The $3^{rd}$ order IM product largely determines ACLR in adjacent bands. The $5^{th}$ order IM product plateau largely determines ACLR in more distant (non-contiguous adjacent) bands. Note, however that in networks such as IEEE 802.16e-2005 and 3GPP LTE networks that support multiple bandwidth types, the dimensions in frequency of the adjacent band would also control such relationships. To avoid the relative increase in ACLR due to larger OBW, it is generally necessary to reduce or de-rate transmission power created by the interfering entity in proportion (although not necessarily linearly so) to the increase in OBW. Given a reference OBW (OBWREF) with a known (e.g. 0) power de-rating (PDREF) needed to meet a specified ACLR, an occupied bandwidth power de-rating (OBPD) can be defined for an arbitrary OBW relative to the reference OBW. The OBPD can be obtained empirically but may also be approximated mathematically by an equation such as:

$$\text{OBPD} \propto 10 \cdot \log_{10}(\text{OBW}/\text{OBW}_{ref}) \quad (1)$$

Generally, the transmission power of the mobile terminal must be reduced by OBPD to keep adjacent channel power leakage and therefore ACLR the same for a transmission with a larger OBW compared to one with a smaller reference OBW. The total power de-rating (TPD) needed to account for both an occupied bandwidth power de-rating (OBPD) and a waveform power de-rating (WPD) in order to meet a given ACLR requirement can be represented by:

$$TPD = f(OBPD, WPD) \quad (2)$$

Note that the function $f(.)$ may, for example, be the simple summation of OBPD and WPD. The WPD accounts for waveform attributes such as modulation and number of frequency or code channels and can be determined empirically through power amplifier measurements or indicated by a waveform metric such as the Cubic Metric (CM). The additional power de-rating from OBPD (beyond WPD alone) generally means worse cell edge coverage for wireless terminals unless mitigated. For example, a transmission with 4.5 MHz occupied bandwidth on a 5 MHz E-UTRA carrier with a fixed 5 MHz carrier separation will have a larger measured ACLR (e.g., approximately −30 dBc instead of −33 dBc) with regard to the adjacent 5 MHz carrier than a transmission with only 3.84 MHz occupied bandwidth. To reduce the ACLR back to −33 dBc requires an OBPD of approximately 0.77 dB (based on empirical measurements) which is close to the 0.70 dB given equation (1) above based on OBW of 4.5 MHz and $\text{OBW}_{REF}$=3.84 MHz.

The cubic metric (CM) characterizes the effects of the $3^{rd}$ order (cubic) non-linearity of a power amplifier on a waveform of interest relative to a reference waveform in terms of the power de-rating needed to achieve the same ACLR as that achieved by the reference waveform at the PA rated power. For example, a UE with a power class rating of 24 dBm can nominally support a rated maximum power level (PMAX) of 24 dBm. In practice, the UE's current, or instantaneous, or local maximum power level is limited to the operational maximum power level given by PMAX−f(OBPD, WPD) where $f(.)$ can, for example, be the simple summation of OBPD and WPD such that the operational maximum power level is PMAX−(OBPD+WPD). The difference between PMAX and the UE's current power level after power control or after assignment of an arbitrary power level less than PMAX is called the UE's power margin or power headroom. Scheduling can be used to reduce or avoid OBPD.

In one embodiment, the scheduler allocates the radio resource based on the interference impact by assigning bandwidth based on power headroom of the schedulable wireless communication entity. Particularly, the scheduler finds a bandwidth size that reduces OBPD enough such that operational maximum power (PMAX−OBPD−WPD) does not limit current power of the schedulable wireless communication entity.

A scheduler may control leakage into adjacent and non-contiguous adjacent bands by scheduling mobile terminals that are "close" to the serving cell in terms of path loss with bandwidth allocations that occupy the entire carrier band or a bandwidth allocation that includes resource blocks (RBs) that are at the edge of the carrier band (e.g., 5 MHz UTRA or LTE carrier) since, due to power control, it is very unlikely that such a terminal will be operating at or near to PMAX and therefore unlikely that its current power level would be limited by the operational maximum power. A scheduler may schedule terminals that have little or no power margin with bandwidth allocations that exclude resource blocks at the carrier band edge therefore reducing OBPD and reducing the likelihood of the terminal being power limited by the operational maximum power. It is possible to preserve frequency diversity for terminals assigned a smaller transmission bandwidth to minimize OBPD by using RB hopping over a longer scheduling time interval composed of several frames. Signaling overhead may be reduced by using pre-determined hopping patterns, or pre-defined logical physical permutations. A UE will determine the OBPD corresponding to its scheduled or allocated bandwidth size and location of the allocated bandwidth in the carrier band. The UE therefore computes an operational maximum power for every scheduled transmission to determine if the current power level will be limited.

In some embodiments, the schedulable wireless communication entity obtains maximum transmitter power information based on the radio resource assignment from reference information stored on the mobile terminal. For example, the maximum transmit power information may be obtained from a look-up table stored on the wireless terminal. Alternatively, the maximum transmit power information may be obtained in an over-the-air message. Several examples of the relationship between the radio resource assignment and the maximum transmit power adjustment are discussed more fully below. FIG. 4 illustrates exemplary OBPD de-rating values.

A BS may execute such scheduling decisions not simply from considerations of interference offered by a UE to frequency-adjacent base stations, but may also simultaneously optimise the performance of multiple UEs whose allocated resources are derived from a common set of carrier frequency resources (possibly extending over more than one carrier frequency). That is, the BS may optimize its scheduling allocations from consideration of the mutual interference offered between a multiplicity of UEs.

The power radiated into an adjacent frequency band by a UE, and the distortion offered by a UE to a BS receiver (or other UE receiver in the case of a TDD system) within the set of time-frequency resources allocated by the BS, is governed by several practical design criteria related to the implementation of mobile terminal transmitters, including oscillator phase noise, digital-analog converter noise, power amplifier (PA) linearity (in turn controlled by power amplifier mode, cost, power consumption etc.), among others.

Generally, however, and in common with most non-linear transformations expandable in terms a polynomial power series, UE power amplifiers give rise to undesired adjacent band interference in broad proportion, for a given PA design, to the mean power offered to the PA input. As a consequence of $3^{rd}$ or $5^{th}$ order polynomial terms, the frequency at which interference occurs is at 3 or 5 times the frequency of the input signal components, or harmonics thereof. Also, the power of such out-of-band components generally increases at 3 or 5 times the rate of increase of the input power level.

Accordingly, mobile terminals may control their out-of-band emission levels by limiting the power to the PA. Given a specific rated maximum output (or input) power level designed to achieve a given level of interference into an adjacent frequency band, or level of in-band distortion, a mobile terminal may elect to adjust, for example, reduce its input power level in order to reduce such unwanted effects. As described elsewhere herein, a decision to increase or decrease the input or output PA power may be subject to other criteria, including waveform bandwidth, location in a frequency band, waveform quality metric, among others.

Generally, attributes of the waveform entering the power amplifier, along with attributes of network or UE operational parameters (such as the desired level of out-of-band emissions, in-band distortion, or other criteria described herein) are input to a controller which executes a pre-defined power adjustment function or de-rating function $f(x1, x2, x3, \ldots,$ xN) that relates the attributes x1 etc. to a maximum power level (where it is understood that de-rating may refer to a power level in excess, or less than, a nominal or rated maximum power level).

Figure 6:
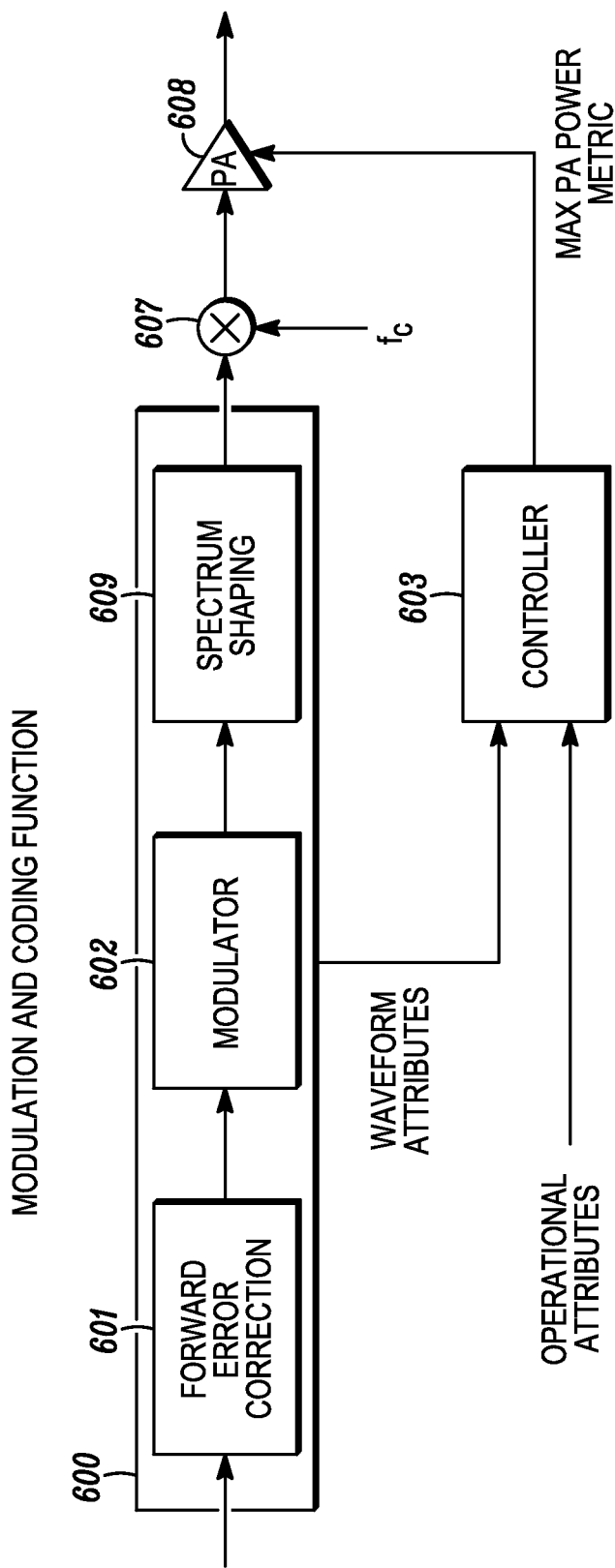
FIG. 6 illustrates a power amplifier under control of a controller modifying the maximum power level.

In FIG. 6, a modulation and coding function 600 accepts an information bit stream, such as higher layer protocol data units, and then applies techniques such as forward error correction 601, modulation 609, and linear and non-linear spectrum shaping 605 methods prior to frequency conversion 607 and input to a PA 608. A controller 603 may derive waveform attributes from the configuration of the modulation and coding function 600 or from direct observation of the signal immediately prior to frequency conversion 607. The controller 603 may also derive operational attributes from stored parameters or parameters signaled by the network. The controller 603 then uses the waveform attributes, which may include signal bandwidth, frequency location, among others, plus the operational attributes such as operational band, adjacent technology among others, to adjust the permitted maximum PA power value 605 which is offered as a control metric to the PA 608.

In one embodiment, the radio resource allocated to a schedulable wireless communication entity is based on a maximum power available to the schedulable wireless communication entity for the radio resource allocated alone or in combination with other factors, for example, the interference impact. For a particular radio resource allocation, the scheduler knows the maximum transmit power of the corresponding schedulable wireless communication entity or device. The scheduler may thus use this information to manage the scheduling of schedulable wireless communication entities, for example, to reduce interference.

In some embodiments, the scheduler determines a bandwidth size of the radio resource and allocates determined bandwidth to the schedulable wireless communications. The scheduler may also determine where within a carrier band the assigned radio resource is located. In one particular implementation, the scheduler allocates bandwidth nearer an edge of a carrier band when the schedulable wireless communication entity requires less transmit power, and the scheduler allocates bandwidth farther from the edge of the carrier band when the schedulable wireless communication entity requires more transmit power. These allocations of course may depend on the interference impact, for example, the proximity of neighboring carrier bands among other factors discussed herein. In another implementation, the scheduler allocates a radio resource to the schedulable wireless communications entity nearer an edge of a carrier band when a radio frequency distance between the schedulable wireless communication entity and the other wireless communications entity is larger, and the scheduler allocates the radio resource to the schedulable wireless communications entity farther from the edge of the carrier band when the radio frequency distance between the schedulable wireless communication entity and the other wireless communications entity is smaller.

Figure 5:
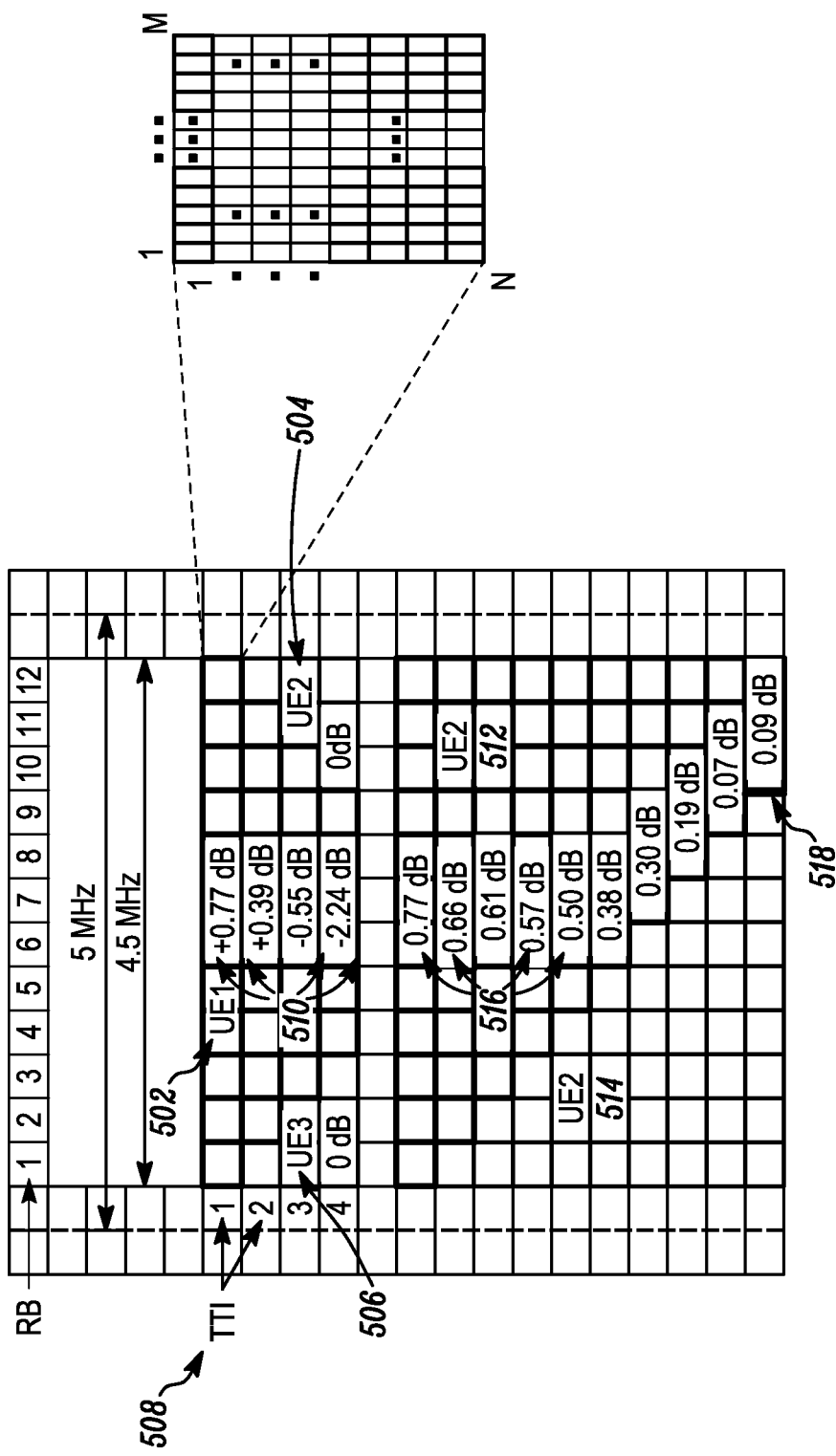
FIG. 5 illustrates a radio resource assignment to multiple entities.

FIG. 5 illustrates, for successive transmission time intervals or TTIs (frames) 508, resource allocations to UE1 502 that are centered in the allocable band about DC and allocations for UE2 504 and UE3 506 located at each band edge. FIG. 5 shows a carrier band of 5 MHz with 4.5 MHz of allocable bandwidth in units of 375 kHz resource blocks (RBs) such that 12 RBs span the entire 4.5 MHz. Adjacent carriers are on either side of the 5 MHz carrier and are typically separated by a guard band. Out-of-band emissions decrease more rapidly when band edge occupancy is reduced or avoided. Therefore, reducing the size of band centered allocations as shown by UE1 502 means OBPD also decreases more rapidly 510. If, for example, two or more RBs at the band edge are not allocated then the OBPD may be less than 0. Out-of-band emissions (and OBPD 516) for allocations that include band edge RBs as shown for UE4 512 and UE5 514 decrease more slowly as the allocation is reduced compared to band-centered allocations. In the particular example shown, not until the occupancy of a resource allocation with band edge RBs 512 UE4 drops below ⅓ of the total allocable band does the OBPD drop below zero 518.

Figure 7A:
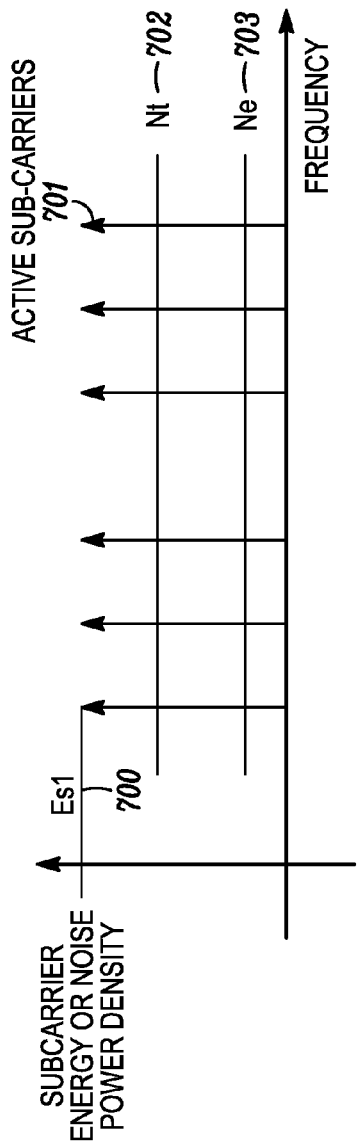
FIG. 7 illustrates a received signal at a wireless communication receiver, conditioned on the maximum power of a wireless transmitter power amplifier.

The BS may enhance its ability to optimally adjust the maximum permitted power level of UEs under the control of the BS by occasionally measuring the BS receiver noise power contribution arising from reduced transmitter waveform quality among UEs. FIG. 7a illustrates this method in more detail in the context of OFD transmissions, or more generally transmissions comprising multiple sub-carriers. Specifically, a UE is shown transmitting on a set of active frequency sub-carriers 701 received at the BS receiver with a specific energy per sub-carrier Es1 700 and with an associated signal-noise ratio Es1/Nt with respect to the BS receiver thermal noise power density Nt 702.

In FIG. 7a, the waveform and hence frequency sub-carriers transmitted by the UE are also subject to impairments attributable to practical limitations of the UE transmitter. Although such impairments generally have frequency dependency, they may be regarded, to a first approximation, as a frequency-invariant additive noise power spectral density shown, at reception by the BS receiver, as a noise power density Ne 703. Generally, the UE transmitter performance is such that the received noise density Ne due to transmitter impairments is received at a level sufficiently below the BS receiver thermal noise density Nt so as to lead to a negligible increase in the effective total receiver noise density, i.e., Nt+Ne≈Nt.

Figure 7B:
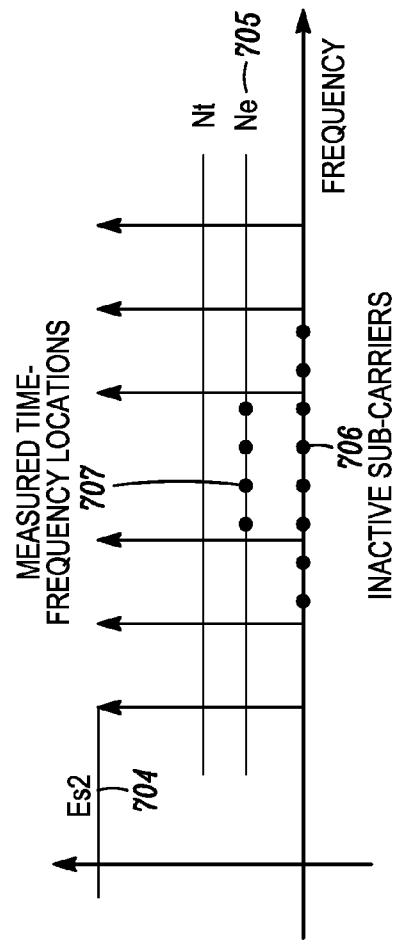

In FIG. 7b, when operating under specific conditions, for example, when located at the edge of uplink cell coverage, it may be beneficial for the UE to adjust its maximum transmitter power level so as to increase the effective received energy per sub-carrier Es2 704. Due to the non-linear nature of the power amplifier, this may give rise to a proportionally larger (in dB) increase in the received noise density Ne 705 due to transmitter impairments, but if Ne remains at a level smaller than Nt, a net benefit in sub-carrier signal-noise ratio can accrue.

In order to permit the UE to optimize the ratio of Es/Ne at the transmitter, the BS may broadcast an indication of a) the BS receiver thermal noise density Nt, b) the received noise component Ne due to UE transmitter impairments, or c) a combination, sum, or some function of those measures. The UE may then optimize its maximum transmitter power level to optimize the sub-carrier signal-noise ratio. For example, if the UE had available, from downlink power measurements, for example, an estimate of the path loss between the BS and UE, the UE may select the maximum radiated power level such that the received energy per sub-carrier and associated receiver noise power density Ne, due to transmitter impairments, is optimized. In support of this, the BS may elect to schedule specific time-frequency instances, or measurement opportunities, where a known set of sub-carriers 706 or other time-frequency resources are known to be absent. This permits the BS receiver to measure the desired noise power statistic (say, Nt+Ne) as shown in FIG. 7b.

The BS may also transmit to a specific UE (unicast), or broadcast over a specific cell or cells or over the entire network a specified measure of the ratio, measured at the UE PA output, between the energy per active sub-carrier Es, and the equivalent noise power density in inactive sub-carriers. A UE receiving such an indication, via a common or dedicated control channel, would then a) adjust their maximum power level such that the ratio Es/Ne is aligned with the specified broadcast or unicast value. Alternatively, the BS may also transmit an upper or lower bound on this ratio. Typically, the transmission on the control channel of such a measure would require quantization of the specified value or bound to an integer word of a number N of bits.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a schedulable wireless communication entity having an operational maximum power level and that communicates in a wireless communication network, the method comprising:

receiving, at the schedulable wireless communication entity, a radio resource assignment, the radio resource assignment includes resources in a frequency band;

varying an operational maximum power level of the schedulable wireless communication entity based on whether the schedulable wireless communication entity is communicating time-critical traffic or non-time-critical traffic, the operational maximum power level limits an instantaneous power at which the schedulable wireless communication entity may transmit on the radio resource assigned;

wherein varying the operational maximum power level includes:

decreasing the operational maximum power level by a first adjustment if the schedulable wireless communication entity is communicating time-critical traffic and by a second adjustment if the schedulable wireless communication entity is communicating non-time-critical traffic as bandwidth allocated to the schedulable wireless communication entity increases, an amount of the first adjustment and the second adjustment are dependent on the increase in bandwidth; and increasing the operational maximum power level by a third adjustment if the schedulable wireless communication entity is communicating time-critical traffic and by a fourth adjustment if the schedulable wireless communication entity is communicating non-time-critical traffic as bandwidth allocated to it decreases, an amount of the third adjustment and the fourth adjustment are dependent on the decrease in bandwidth.

2. The method of claim 1, wherein the operational maximum power level is based on a difference between a rated maximum transmit power and maximum transmit power adjustment information based on the radio resource assignment from reference information stored on the schedulable wireless communication entity.

3. The method of claim 1, wherein the operational maximum power level is based on a difference between a rated maximum transmit power and a function of a waveform power derating and an occupied bandwidth power derating.

4. The method of claim 1, varying the operational maximum power level using a first adjustment function if the schedulable wireless communication entity is communicating time-critical traffic and using a second adjustment function if the schedulable wireless communication entity is communicating non-time-critical traffic based on distance to an adjacent frequency band.

5. The method of claim 1, varying the operational maximum power level using a first adjustment function if the schedulable wireless communication entity is communicating time-critical traffic and using a second adjustment function if the schedulable wireless communication entity is communicating non-time-critical traffic based on a frequency band allocated to the schedulable wireless communication entity.

6. The method of claim 1, de-rating the operational maximum power level of the schedulable wireless communication entity by a first adjustment function if the schedulable wireless communication entity is communicating time-critical traffic and by a second adjustment function if the schedulable wireless communication entity is communicating non-time-critical traffic in accordance with frequency bands adjacent to the frequency band within which the radio resource was allocated.

7. The method of claim 1, varying the operational maximum power level by a first adjustment function if the schedulable wireless communication entity is communicating time-critical traffic and by a second adjustment function if the schedulable wireless communication entity is communicating non-time-critical traffic in accordance with a wireless communication technology deployed in a frequency band adjacent to the frequency band including the radio resource allocated to the schedulable wireless communication entity.

8. A wireless communication entity schedulable in a wireless communication network, the wireless communication entity comprising:
 a radio receiver, the radio receiver receiving radio resource assignment information including a bandwidth allocation;
 a power amplifier;
 a controller communicably coupled to the power amplifier, the controller varying an operational maximum power level of the wireless communication entity based on whether the wireless communication entity is communicating time-critical traffic or non-time-critical traffic;
 wherein the operational maximum power level limits an instantaneous power at which the wireless communication entity may transmit on the radio resource assigned;
 wherein varying the operational maximum power level includes:
  decreasing the operational maximum power level by a first adjustment if the wireless communication entity is communicating time-critical traffic and by a second adjustment if the wireless communication entity is communicating non-time-critical traffic as the size of the bandwidth allocation to the wireless communication entity increases, an amount of the first adjustment and the second adjustment are dependent on the increase in bandwidth; and
  increasing the operational maximum power level by a third adjustment if the wireless communication entity is communicating time-critical traffic and by a fourth adjustment if the wireless communication entity is communicating non-time-critical traffic as the size of the bandwidth allocation to the wireless communication entity decreases, an amount of the third adjustment and the fourth adjustment are dependent on the decrease in bandwidth.

9. The entity of claim 8, wherein the operational maximum power level is based on a rated maximum transmit power, wherein the rated maximum transmit power level corresponds to a power class supported by the wireless communication entity.

10. The entity of claim 8, wherein the operational maximum power level is based on a difference between a rated maximum transmit power and maximum transmit power adjustment information based on the radio resource assignment from reference information stored on the wireless communication entity.

11. The entity of claim 8, wherein the operational maximum power level is based on a difference between a rated maximum transmit power and a function of a waveform power derating and an occupied bandwidth power derating.

12. The entity of claim 8, the radio resource assignment includes a time-frequency resource, the controller varying the operational maximum power level based on a waveform metric and whether the wireless communication entity is communicating time-critical traffic or non-time-critical traffic.

13. The entity of claim 8,
 the radio resource assignment includes a time-frequency resource,
 varying the operational maximum power level based on the allocated time-frequency resource and whether the wireless communication entity is communicating time-critical traffic or non-time-critical traffic.

14. The entity of claim 8, the controller varying the instantaneous transmit power of the wireless communication entity based on maximum power adjustment information received from the wireless communication network and whether the wireless communication entity is communicating time-critical traffic or non-time-critical traffic.

15. The entity of claim 8, the radio resource assignment information including modulation information, varying the operational maximum power level based on the modulation information by a first adjustment if the wireless communication entity is communicating time-critical traffic and by a second adjustment if the wireless communication entity is communicating non-time-critical traffic.

16. The entity of claim 8, the bandwidth allocation includes multiple subcarriers, varying the operational maximum power level based on a number of subcarriers in the bandwidth allocation and whether or not the wireless communication entity is communicating time-critical traffic.

* * * * *